United States Patent [19]

Van De Ven

[11] Patent Number: 5,058,530
[45] Date of Patent: Oct. 22, 1991

[54] DEVICE FOR COLLECTING EGGS

[76] Inventor: Cornelis A. W. Van De Ven, Stokkelen 10, NL-5521 NB, Eersel, Netherlands

[21] Appl. No.: 365,896

[22] Filed: Jun. 14, 1989

[30] Foreign Application Priority Data

Nov. 6, 1987 [NL] Netherlands .......................... 8702668

[51] Int. Cl.$^5$ ............................................. A01K 31/16
[52] U.S. Cl. ..................................................... 119/48
[58] Field of Search ................... 119/45.1, 47, 48, 50.5

[56] References Cited

U.S. PATENT DOCUMENTS

| | | | |
|---|---|---|---|
| 2,279,147 | 4/1942 | Stimson | 119/48 |
| 2,638,438 | 7/1954 | Peterson | 119/48 |
| 2,692,578 | 10/1954 | Manning | 119/48 |
| 2,728,324 | 12/1955 | Radocy | 119/48 |
| 2,765,772 | 10/1956 | Inman | 119/48 |
| 3,164,129 | 1/1965 | Rigterink | 119/48 |
| 3,465,723 | 9/1969 | Matunaga | 119/48 |
| 3,650,246 | 3/1972 | Fowler et al. | 119/48 |
| 4,364,332 | 12/1982 | Smith | 119/48 |

FOREIGN PATENT DOCUMENTS 2365951 6/1978 France .................................. 119/48

Primary Examiner—Gene Mancene
Assistant Examiner—R. Thomas Price
Attorney, Agent, or Firm—Watson, Cole, Grindle & Watson

[57] ABSTRACT

A device for collecting fertilized eggs of poultry consisting substantially of at least one space bounded by a base board, a roof and three walls for accommodating at least one egg-laying annual, on which space a discharge conveyor is arranged close to the open side of the space(s), wherein the base board of the space is arranged for swiveling about an axis of rotation lying near the lower edge of the open side thereof such that the base board can be moved from a less inclined laying position into a more inclined closing position for closing off the open side of the space, so preventing the egg-laying animal from returning into the space after laying one or more eggs.

20 Claims, 2 Drawing Sheets

1

DEVICE FOR COLLECTING EGGS

BACKGROUND AND SUMMARY OF THE INVENTION

The invention relates to a device for collecting eggs of poultry consisting substantially of at least one space bounded by a base board, roof and three walls for accommodating at least one specimen, on which space a discharge conveyer is arranged close to the base board on the standing open side.

Many embodiments of laying nests, coops or batteries already exist which all serve to separate the egg, whether or not in fertilized state, from the animal and collect it for further use. The invention relates particularly to those devices intended for the collection of fertilized eggs, whereby the female animal displays brooding tendencies. This means that the animal will want to lie on the egg in order to hatch it out, which must be prevented. The existing devices are equipped with means which could be described as less than animal friendly.

The device according to the invention is distinguished in that the base board of the space is arranged for swiveling about an axis of rotation lying near the lower edge of the open side thereof such that the base board can be moved from a less inclined laying position into a more inclined closing position for closing off the open side of the space.

The swivel movement can be carried out to reach the closing position at appropriate times, depending on the type of poultry, with the resulting advantage that the eggs laid on the base board roll automatically onto the conveyer belt in front of the open side of the space. Due to the gradual movement of the base board this will take place without damage occurring and a 100% egg discharge is ensured. The broody animal does not have any opportunity to incubate the egg because it is removed from the space. This results not only in a separation between animal and laid egg but also to the space being cleared regularly in order to give other animals the opportunity to make use of the laying area after the base board has been moved back.

These and other features will be elucidated in the figure description of two embodiments following hereinafter.

DETAILED DESCRIPTION OF THE PREFERRED EMBODIMENTS

Figure 1:
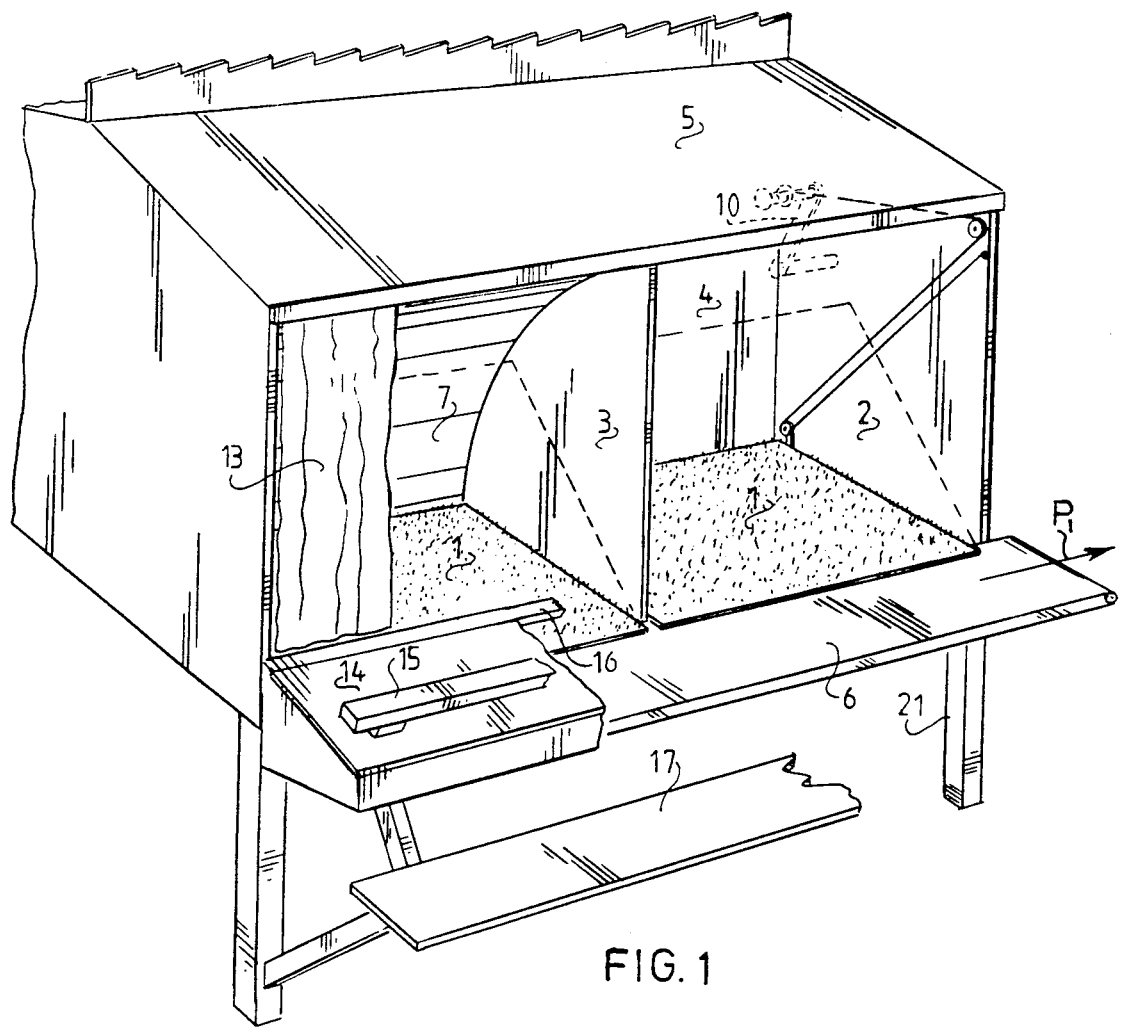
FIG. 1 shows a perspective front view of a device as according to a first embodiment of the invention.
Figure 2:
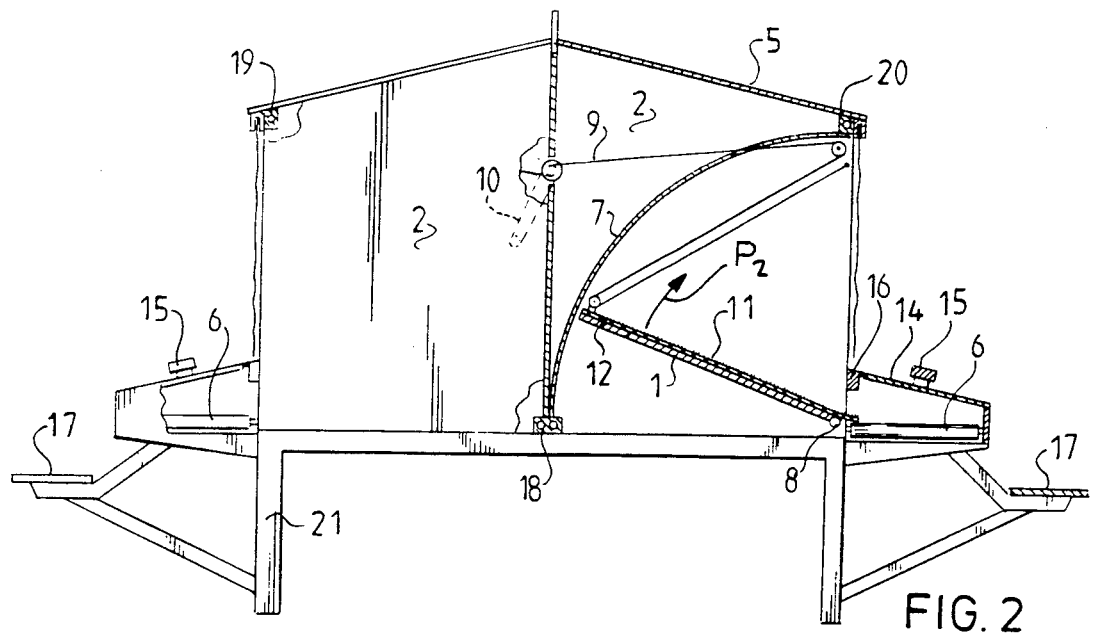
FIG. 2 is a standing side view shown partially in section of the device from FIG. 1.

The laying device shown in FIG. 1 and 2 has two spaces adjoining one another in addition to a group of spaces arranged mirror-symmetrically behind them and not shown in FIG. 1.

Each space is bound by a base part 1, three standing walls 2, 3 and 4 as well as a roof part 5. The rear wall 4 and roof portion 5 are formed for each space from the same sheet of material, for instance of wood or wood fiber material. The end walls 2 and the partition wall 3 are also of continuous pieces of material for the mirror-symmetrical spaces, see FIG. 2. This material can also be of wood or wood fiber.

Running along the open front side of each space is a common conveyer belt 6 which is driven by a drive motor (not shown) in the direction of arrow $P_1$.

In the embodiment shown each space has in addition an arched rear plate 7, on the left in FIG. 1, which arched rear plate is omitted in the right-hand space in FIG. 1 for the sake of clarity. This rear plate may be of random material, for instance metal.

In accordance with a main feature of the invention the base board 1 is placed in the space for swiveling and is fixed for this purpose on the lower edge of the open front side to a common rotary shaft 8 which can be bearing mounted in the walls 2, 3 in any suitable manner. The swiveling movement can be effected through a lifting system consisting of a tackle 9 which can be actuated by a common lever 10 situated on the outside of the laying device. The tackle 9 grips onto the outermost right-hand base board in FIG. 1 which as it moves upward also carries the adjoining base boards with it in upward direction via the common swivel shaft 8.

Each base board can consist of a support plate which is covered with a mat 11 of suitable material, for example plastic matting, and synthetic grass matting in particular.

A feature of the invention is that the synthetic grass matting extends beyond the lower edge and beyond the swivel shaft 8 such that the bottom edge thereof is located above the top portion of the conveyer 6. The matting 11 is preferably only fastened on the top to the support plate of base board 1 by means of attaching rivets 12.

The open front side of each space may be more or less partially closed off by a curtain 13 which is attached to the laying device at the top and hangs free at the bottom.

Finally, the conveyer 6 is closed off on the top side by a covering board 14 provided with a take-off strip 15 for the animals arranged thereon, so that they can gain access to the laying areas over the conveyer belt 6. The board 14 is hinge connected along the upper edge to a beam 16 so that the upper part of conveyer 6 becomes accessible when board 14 is raised upward. The interval between the beam 16 and the synthetic grass matting 11 of base board 1 is such that passage of eggs is possible.

It is finally noted that at the front on a lower level than the conveyer 6 a springboard 17 is arranged on a frame 18 present beneath the laying device.

The above-described device works as follows:

One or more poultry animals at a time can gain access into the space via springboard 17 and take-off board 15 and to the more or less sloping base board 1 with its synthetic grass matting cover. After the animal has laid an egg, this egg will perhaps roll onto the conveyer belt 6 as a result of the sloping position and the poking about of the animal. There is the chance, however, that because of the relatively rough surface of the synthetic grass matting the egg will remain in place.

This drawback is obviated because after a period of time the base boards 1 are moved upward by turning the handle 10 located on the outside of the laying house, which results in the cord 9 of the tackle being would around a reel couple to handle 10, and the base board being swiveled upward in the direction of the arrow $P_2$, see FIG. 2. Because of the upward sloping position of the base board, the animal is pushed out of the space 1, whereby at the same time eggs that have been left in place roll downward onto the conveyer 6 as a result of this more sloping position. It is noted that during this process the animal cannot be held fast by the curtain 13 which will give to the outside as the animal is being pushed out.

After a time the base board can be moved back so that the spaces are once again free for the poultry for the following laying process.

As will be seen in FIG. 2 the laying device can take a mirror-symmetrical form whereby the base board parts 1 can be moved upward with the same crank handle 10.

It is further apparent that the handle 10 can be replaced by a drive motor, with for instance a time clock.

It is further remarked that the construction of the laying device of wooden boards or wood fiber boards lends itself well for instance to a building kit. The end walls 2 as well as partition walls 3 can be assembled into the spatial construction particularly simply by means of beams 18, 19, 20 and the associated mortise and tenon joints, whereby only the roof boards 5 have to ensure the required stability. The underlying frame 18 can be assembled in any random manner, while the base boards 1 with the common shaft 8 are bearing mounted in the end and partition walls 2, 3.

Figure 3:
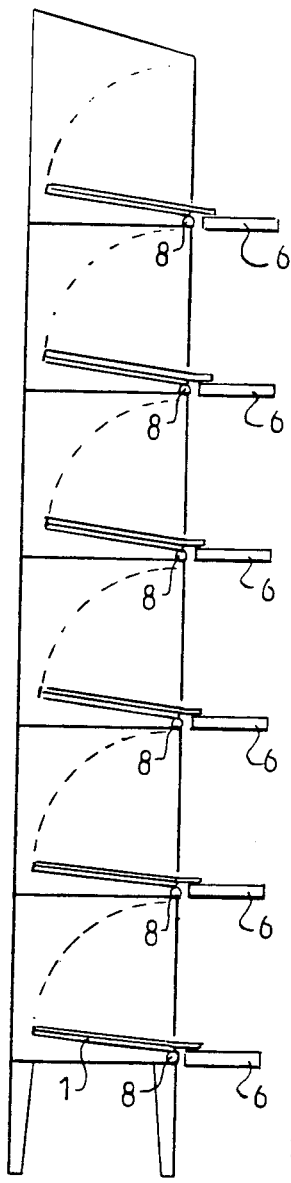
FIG. 3 shows a view corresponding to FIG. 2 of an alternative embodiment.

With respect to FIG. 3 it is noted that not only mirror-symmetrical embodiments are possible but that the laying areas can also be arranged one above the other in a bird-house system. Each space is again provided with a base board which can swivel about a common shaft 8. The shafts 8 lying above each other at each level can if required be moved using a suitable chain mechanism, simultaneous movement of the base boards 1 being performed using a single drive motor and for instance a time clock. Each level is additionally provided with its own discharge conveyer 6.

The discharge of the eggs coming from the conveyer belts 6 can be performed in any known and suitable manner.

The invention is not limited to the above described embodiments.

I claim:

1. An egg collecting device comprising a housing means including housing portions defining an area for receiving egg-laying animals, said portions defining a side opening in communication with said area, said portions including a bottom portion having an upper surface on which eggs are laid, said bottom portion being mounted for swinging movement about an axis disposed adjacent a lower part of said side opening so that the bottom portion can swing from a laying position to a further position which substantially closes said side opening, manually-controllable operating means for moving said bottom portion from said laying position to said further position to force an egg-laying animal out of said housing, and conveying means disposed adjacent said side opening for receiving eggs from said upper surface.

2. A device as defined in claim 1 wherein said bottom portion slopes downwardly toward said side opening in said laying position, and wherein said bottom portion has a greater slope toward said side opening as it is moved toward said further position.

3. A device as defined in claim 1 wherein said upper surface of said bottom portion includes a sheet of flexible material, said sheet of flexible material having an outer edge which overlies a part of said conveying means.

4. A device as defined in claim 1 including closure means for partially closing off said side opening.

5. A device as defined in claim 4 wherein said closure means comprises a sheet of flexible material which is connected to said housing adjacent an upper part of said side opening and which hangs downwardly from said housing.

6. A device as defined in claim 1 including a cover means disposed over said conveying means and spaced therefrom, said cover means being swingable into a position to permit access to the conveying means.

7. A device as defined in claim 6 wherein said cover means is spaced from said bottom portion to provide an opening through which eggs may move from said bottom portion to said conveying means.

8. A device as defined in claim 1 wherein said housing means defines a plurality of similar areas for receiving egg-laying animals, each of said areas including a bottom portion having an upper surface upon which eggs are laid, each of said bottom portions being similarly mounted for swinging movement, and means for interconnecting said bottom portions to one another so that they swing in unison.

9. A device as defined in claim 8 wherein said conveying means is disposed adjacent the side openings of a plurality of areas for receiving eggs from different areas.

10. An egg collecting device comprising a housing including wall portions defining an area for receiving egg-laying animals, said wall portions defining a generally vertical side opening in communication with said area, said side opening having upper and lower edges, said wall portions including a bottom wall portion having an upper surface on which eggs are laid, said bottom wall portion being mounted for swinging movement about an axis disposed adjacent the lower edge of said side opening so that the bottom wall portion can swing from a laying position to a further position which substantially closes said side opening and forces an animal out of said area, manually-controllable operating means for moving said bottom wall portion between said positions irrespective of the presence of an egg-laying animal thereon, and generally horizontal conveying means disposed adjacent the lower edge of said side opening for receiving eggs from said upper surface.

11. A device as defined in claim 10 wherein said bottom wall portion slopes downwardly toward the lower edge of said side opening in said laying position and is disposed generally vertically in said further position.

12. A device as defined in claim 10 wherein the upper surface of said bottom wall portion includes a sheet of flexible material which extends beyond said bottom wall portion and said pivot axis into overlying relationship to a lateral portion of said conveying means.

13. A device as defined in claim 10 including flexible closure means having an upper and lower edge portion, the upper edge portion of said closure means being connected to said housing adjacent the upper edge of said side opening, the lower edge portion of said closure means being a free edge portion spaced above the lower edge of said side opening.

14. A device as defined in claim 10 including cover means for said conveying means, said cover means being mounted for swinging movement about a further axis spaced above said first axis, said cover means being spaced from said bottom wall portion so as to provide an opening through which eggs can move from said bottom wall portion to said conveying means.

15. A device as defined in claim 10 wherein said wall means defines a plurality of substantially identical areas for receiving egg-laying birds, each of said areas including a bottom wall portion having an upper surface for receiving eggs, and means for interconnecting all of said bottom wall portions for swinging movement together upon operation of said operating means.

16. A device for collecting fertilized eggs from an egg-laying animal which comprises:

a housing in which an egg-laying animal can enter to lay an egg, said housing comprising two lateral side walls, a rear wall, a roof, a support plate and an open front side, said support plate having a front edge adjacent said open front side which is pivotally mounted so that the support plate can pivot between a first inclined position which permits entry of an egg-laying animal through the open front side of the housing and onto the support plate and a second position wherein said support plate effectively closes said open front side, a conveyor means positioned externally of said housing and adjacent said open front side of said housing and onto which any eggs laid on said support plate can roll, and manually-controllable lift means connected to said support plate so as to lift said support plate from said first inclined position to said second position and thereby force an egg-laying animal on said support plate out of said housing.

17. A device as defined in claim 16, including a mat which is positioned on said support plate and which extends out of said open front side of said housing and above said conveyor means to help prevent fracturing of an egg that rolls from inside said housing onto said conveyor means.

18. A device as defined in claim 16, wherein said manually-controllable lift means comprises a tackle system connected to said support plate.

19. A device as defined in claim 18, wherein said tackle system includes a manually-operable lever. force of an egg-laying animal on said support plate out of said housing.

20. A device as defined in claim 16, including an arched rear plate which extends from a bottom edge of a said rear wall to a front edge of said roof.

* * * * *